United States Patent
Hamilton, Jr.

[15] 3,698,634
[45] Oct. 17, 1972

[54] INSULATED RAIL JOINTS

[72] Inventor: William R. Hamilton, Jr., Naperville, Ill.

[73] Assignee: Portec, Inc., Chicago, Ill.

[22] Filed: Oct. 2, 1968

[21] Appl. No.: 764,563

[52] U.S. Cl. .................................. 238/152, 238/243
[51] Int. Cl. ............................................. E01b 11/54
[58] Field of Search .............. 156/171, 172, 188, 195; 238/152, 243

[56] References Cited

UNITED STATES PATENTS

| | | | |
|---|---|---|---|
| 3,006,553 | 10/1961 | Greer | 238/152 |
| 3,154,250 | 10/1964 | Lansing | 238/152 |
| 3,416,728 | 12/1968 | Hamilton | 238/152 |

FOREIGN PATENTS OR APPLICATIONS

| | | | |
|---|---|---|---|
| 253,876 | 10/1933 | France | 238/152 |
| 693,873 | 6/1940 | Germany | 238/152 |
| 882,568 | 5/1953 | Germany | 238/152 |
| 508,195 | 12/1954 | Canada | 238/152 |
| 923,255 | 2/1955 | Germany | 238/152 |

*Primary Examiner*—James B. Marbert
*Assistant Examiner*—Richard A. Bertsch
*Attorney*—Emory L. Groff and Emory L. Groff, Jr.

[57] ABSTRACT

A rail joint including insulated bushings for the joint bolts comprising a metal core having a first layer of a dielectric strengthening composition bonded thereupon and an outer bonded layer of a cold flowable dielectric composition.

11 Claims, 2 Drawing Figures

PATENTED OCT 17 1972 3,698,634

INVENTOR
WILLIAM R. HAMILTON, JR

Emory L. Groff, Jr.
ATTORNEYS

INSULATED RAIL JOINTS

This invention relates generally to insulated rail joints as used in electric signal track sections, and more particularly, to component parts thereof comprising a composite assembly including synthetic plastic elements combined with a metallic member.

Heretofore, to obviate the possibility of short-circuiting the track through said joint bars, including the bolts utilized therein, it has been the practice to use a homogenous hard vulcanized fiber bushing to fit over the shank of each bolt at the general location where it passes through the web of the rail or joint bar. Also, press-molded fiber washers have been used in conjunction with metal straps or washers. However, in each case this type of insulation material is subjected to deterioration factors such as exposure to moisture, water, temperature and pressure changes with likelihood of breakdown to the extent that the effectiveness of the insulated joint is impaired. An alternative has been to provide composite bushings comprising one or more metal sleeves in combination with one or more intermediate or overlying layers of various synthetic plastic compositions.

By the present invention an improved unique arrangement is proposed wherein the unquestioned strength of a rigid metal member is combined with a plurality of specifically arranged and particularly selected disparate components to provide an insulating element particularly adapted to be used as bushings for the bolts in an insulated rail joint assembly.

The relative movement between the various components of a rail joint during the passage of each railway car truck is well known, and it has been the resultant destructive forces transmitted to the bolts and joint bar openings that has caused failure of many of the prior known types of bushings as have been used in insulated joints. Even more destructive to the joint bushings are the thermal stresses as created in winter. These forces are particularly noticeable in the case of welded rail installations wherein the substantial running length of each rail section generates a significant cumulative shrinking of the rail with the resultant tendency to pull the joint apart. The present invention provides an improved bushing element which has been found to exhibit a high degree of resistance to all of the factors heretofore affecting these bushings.

Accordingly, a primary object of the present invention is to provide insulated rail joints having an improved bushing comprising a composite member including a metallic tube combined with a plurality of disparate components.

A further object of the present invention is to provide a bushing in an insulated rail joint comprising an inner metal sleeve having a first outer layer of glass filaments coated with a thermosetting plastic and a second outermost coating of a thermoplastic filament embedded within a thermosetting plastic composition.

Another object of the present invention is to provide an insulated rail joint including a bushing having a metallic core provided with a pair of intermediate outer layers of filament-filled thermosetting resin compositions and including an outermost protective layer of polyurethane.

Still another object of the present invention is to provide a method of making an insulated bushing for a rail joint having a non-deformable core, an inner strengthening layer, and an outer insulating layer capable of limited cold flow.

With these and other objects in view which will more readily appear as the nature of the invention is better understood the invention consists in the novel construction, combination and arrangement of parts hereinafter more fully described, illustrated and claimed.

A preferred and practical embodiment of the invention is shown in the accompanying drawing, in which.

Similar reference characters designate corresponding parts throughout the several figures of the drawing.

Figure 1:
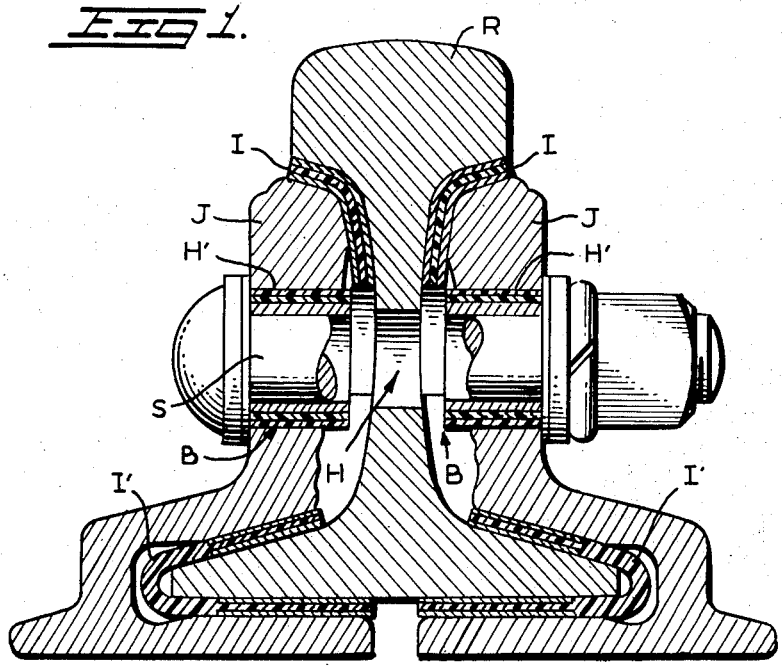
FIG. 1 is a complete vertical sectional view of an insulated rail joint illustrating the present invention.

Referring now to the drawing, particularly FIG. 1, it will be seen that the rail designated R is provided with a plurality of transversely disposed bolt holes H registering with a plurality of holes H' through the joint bars J. The head portions of the joint bars are isolated from the fillets of the rail by means of the insulation member I while the foot portions of the joint bars are each isolated from the rail base by means of the insulation member I'. The construction of the insulation member I and I' is well known and may comprise any of various arrangements of integral or composite assemblies including metal sheaths and bonded layers of electrically insulating dimensionally stable thermosetting resins.

Figure 2:
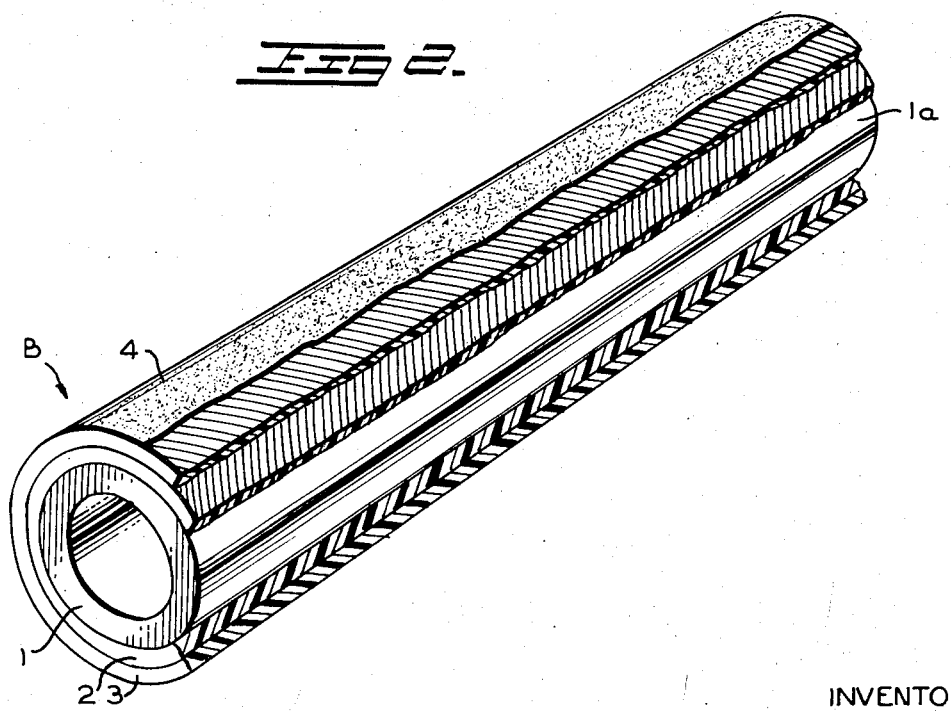
FIG. 2 is a perspective view, with portions broken away, of the insulated bushing as used in the insulated rail joint of the present invention.

The insulating bushing of the present invention, generally designated B, is adapted to be placed about the shank of the bolt S to electrically isolate same from the surrounding joint bars in the area of the holes H'. The preferred construction of the bushing B is disclosed most clearly in the enlarged view of FIG. 2 of the drawing, and will be seen to comprise a metal core 1 extending the entire axial length of the bushing B. This core 1 is preferably a seamless steel tube formed from a normal commercial grade steel such as C–1015 to C–1010 and is utilized in the asdrawn state without heat treatment. The inside diameter of the core 1 is selected to provide a close sliding fit about the shank of the bolt S. About the outer periphery 1a of the metal core 1 is disposed an inner layer 2 comprising glass strands or filaments coated with a thermosetting resin composition. The thickness of the layer 2 is preferably on the order of one-half of the thickness of the steel tubing or core 1. "B" staged epoxy resins have been found to be most satisfactory in combination with the glass filament of the inner layer 2 and many commercial preparations of epoxy resins are readily available for use as proposed in the present invention. As most clearly illustrated in FIG. 2, the coated filaments of the layer 2 are wound or wrapped upon the metal core 1 in a helical manner. With this arrangement additional burst strength is imparted to the steel core by the glass filaments. Experience has demonstrated that the helices of the glass strands should be disposed at an angle between 0° – 45° with respect to a plane perpendicular to the longitudinal axis of the core 1 in order to achieve the maximum strengthening benefit from the inner layer 2 to preclude splitting of the steel core under load.

Around the periphery of the intermediate layer 2 is disposed a thermoplastic filament layer, the filaments of which are coated with a thermosetting resin composition similar to that on the glass filaments of the inner layer 2. Polypropylene has been found to be a suitable thermoplastic composition for use as the filaments of the outer layer 3 due to its melting point which is sufficiently high to not be affected by the heat necessary to cure the epoxy coating contained in the inner and outer layers 2 and 3, respectively. The significance of this will be more apparent upon consideration of the sequence of steps involved in the method of making the present invention as described hereinafter. The thickness of this outer layer 3 is substantially the same as the thickness of the intermediate layer 2 such that the combined thickness of the two layers 2 and 3 approximates the wall thickness of the steel tubing of the core 1. A final coating 4 of polyurethane or other suitable plastic composition, of approximately a 1–5 mil thickness, is provided on the outer periphery of the layer 3.

The method of manufacturing the bushing B of the present invention utilizes winding apparatus which in itself is well known in the art; however it has been found that the present specific sequence of steps utilizing the specified components results in an end product vastly superior to other known forms of insulating bushings. Although the bushing as ultimately utilized is of a relatively short axial length as shown in FIG. 1 of the drawing, the composite structure of the bushing is initially assembled upon a metal core 1 of a relatively long length, which length is dictated solely by the capacity of the particular winding apparatus available. The selected metal core 1 is first cleaned by conventional methods such as by sand-blasting or chemical baths and thereafter mounted upon a winding machine. Strands of the epoxy resin coated glass filament comprising the inner layer 2 are then deposited upon the outer periphery 1a of the metal core 1 by means of any suitable mechanism on the winding apparatus so that the glass filaments of the layer 2 are deposited thereon in a helical manner and at an angle preferably no greater than 45° to a plane perpendicularly disposed with respect to the longitudinal axis of the core 1. As previously advised, the wall thickness of the completed inner layer 2 is approximately one-half the wall thickness of the next adjacent metal core 1. Inasmuch as the diameter of the glass filament included in the inner layer may be of a relatively small dimension, say one thirty-second of an inch, it will be obvious that several layers of superimposed glass filaments will be required to form the completed inner layer 2. After the first complete winding of the glass filaments has been accomplished from one end of the metal core to the other end, the winding operation is reversed such that the next succeeding layer of glass filaments will be disposed at a reverse angle with respect to the preceding layer. In this manner the winding proceeds until the desired thickness is achieved in the inner layer 2.

After depositing the inner layer 2 upon the metal core the same winding procedure is employed to likewise deposit the outer layer 3 upon the periphery of the inner layer 2. Again, the strands of the thermoplastic filament having a thermosetting coating are helically wound upon the composite assembly in an angular relationship like the filaments comprising the inner layer 2 such that succeeding layers of the thermoplastic filament 3 are reversely disposed with respect to one another. When the wall thickness of the outer layer 3 approximates that of the inner layer 2 it will be seen that the sum total of these two wall thicknesses will substantially equal the wall thickness of the metal core 1. The next step is to place the composite assembly within an oven to promote the cure of the thermosetting resin which coats both the glass filaments of the inner layer 2 and the thermoplastic filaments of the outer layer 3. The various components of the assembly will be understood to become bonded into an integral arrangement as the result of the polymerization that occurs during curing of the thermosetting resin. As mentioned hereinbefore, the heat during this polymerization is not of sufficient degree to melt the thermoplastic filament of the outer layer 3. When the outer layer 3 is wound it will be understood that the resultant outside diameter of the composite assembly will be formed slightly oversize. In this manner, following curing, it will be necessary to either machine or centerless grind the assembly to bring it down to the specified outside diameter thereby insuring concentricity of the bushing and providing a smooth periphery by removing excess resin and curtains as produced by the previous steps.

After trimming off the scrap ends of the composite assembly, the individual bushings B may be cut from the thus produced composite stock. As a final step the outside diameter of the outer layer 3 of each bushing is provided with a coating 4 on the order of 1–5 mils of polyurethane after which this final coating is cured by placing the individual bushings in an oven.

As a result of the foregoing method it will be seen that an improved insulated rail joint bushing is provided wherein concentrated loads caused by the bolt shank S pressing in line contact against the bushing are reduced. Many prior forms of bushings in insulated joint assemblies have failed due to the irregularities found in joint bars, particularly in the area of the bolt holes which create high point loadings. By the present invention a high burst strength is provided by the bonded glass filament layer to preclude splitting of the steel tube under load while the thermoplastic composition of the bonded outer layer permits a cold flow of the insulating component under load into the irregularities of the joint to thus provide a greater bearing area and resultant lower unit load.

I claim:

1. An insulated rail joint including a rail section, joint bars provided with holes, transverse bolts and a sleeve-like pre-assembled unitary insulating component disposed around each said bolts and through said joint bars and electrically and mechanically isolating said bolts from said joint bars, said insulating component including a metal sleeve comprising a core of the component, an intermediate layer surrounding the outer periphery of said core and including a structurally reinforced synthetic resin, a next outer layer surrounding said intermediate layer and including a synthetic resinous reinforcing composition having a thermosetting resin coating, and said reinforcing portions of said intermediate and next outer layers are helically disposed within each said respective layer of said sleeve-like insulating component.

2. The insulated rail joint of claim 1, wherein said intermediate layer includes glass filaments providing the reinforcing.

3. The insulated rail joint of claim 2, wherein said glass filaments are coated with a thermosetting resin.

4. The insulated rail joint of claim 3, wherein said thermosetting resin coating said glass filaments is an epoxy resin.

5. The insulated rail joint of claim 1, wherein said thermosetting resin is an epoxy resin.

6. The insulated rail joint of claim 1, wherein said outer layer reinforcing composition comprises polypropylene filaments.

7. The insulated rail joint of claim 1, including a polyurethane coating enveloping said outer layer.

8. The insulated rail joint of claim 1, wherein the wall thickness of said metal sleeve core is substantially equal to the total wall thickness of said intermediate and outer layers.

9. The insulated rail joint of claim 8, wherein the wall thickness of said intermediate layer is substantially equal to the wall thickness of said outer layer.

10. The insulated rail joint of claim 1, wherein the helicies of said filaments are no greater than 45° to a plane perpendicular to the longitudinal axis of said core.

11. The insulated rail joint of claim 10, wherein the filament helices of one of said layers turn in a direction opposite that of the other of said layers.

* * * * *